Oct. 26, 1965

L. GLABERSON ETAL 3,214,539

THERMAL CYCLING SWITCH MECHANISM HAVING
BAKE AND BROIL POSITIONS

Filed May 29, 1962

INVENTORS
LOUIS GLABERSON
DONALD L. DECKER
BY

ATTORNEY

Oct. 26, 1965    L. GLABERSON ETAL    3,214,539
THERMAL CYCLING SWITCH MECHANISM HAVING
BAKE AND BROIL POSITIONS
Filed May 29, 1962                          3 Sheets-Sheet 2

INVENTORS
LOUIS GLABERSON
DONALD L. DECKER
BY
*Andrew H. Hubbard*
ATTORNEY

Oct. 26, 1965 L. GLABERSON ETAL 3,214,539
THERMAL CYCLING SWITCH MECHANISM HAVING
BAKE AND BROIL POSITIONS
Filed May 29, 1962 3 Sheets-Sheet 3
FIG. 7
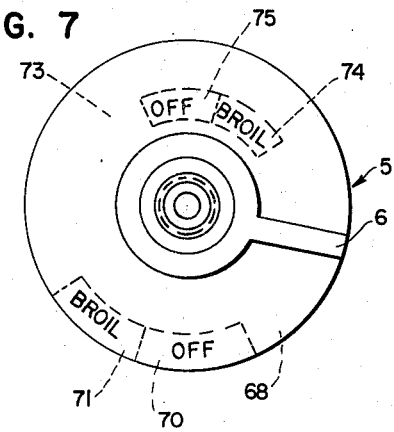
FIG. 8A
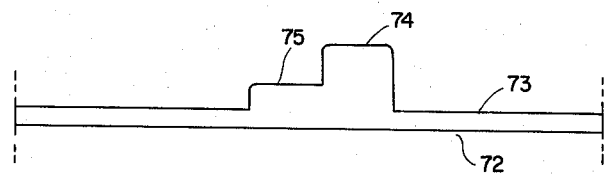
FIG. 8B
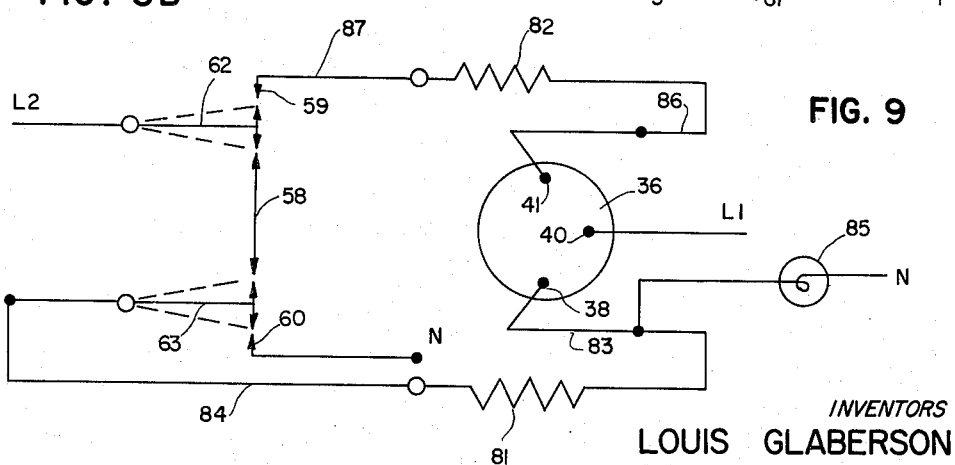
FIG. 9
INVENTORS
LOUIS GLABERSON
DONALD L. DECKER
BY
Andrew S. Hubbard
ATTORNEY United States Patent Office 3,214,539
Patented Oct. 26, 1965

3,214,539
THERMAL CYCLING SWITCH MECHANISM HAVING BAKE AND BROIL POSITIONS
Louis Glaberson and Donald L. Decker, Chicago, Ill., assignors to General Electric Company, a corporation of New York
Filed May 29, 1962, Ser. No. 198,554
5 Claims. (Cl. 200—140)

This invention relates ot control devices for domestic appliances, and in particular to devices for controlling an electric energy circuit in response to temperature changes in a cooking oven or the like.

Electric cooking ovens are equipped with a first resistance heating element in the bottom of the oven, and a second resistance heating element at the top of the oven. In a baking operation it has been found advantageous to energize both the first and second heating elements, with the second element operated at one quarter of its regular wattage to provide what is known in the art as "top heat." This combination of heating elements at the bottom and top of the oven insures heat distribution which contributes greatly to the baking performance of the oven. Broiling operations, on the other hand, are carried out only with the upper heating element, which is energized at its full wattage. In domestic range ovens manufactured by the assignee of applicants' invention, both the lower and upper heating elements have a rating of 3,000 watts, assuming a 230 volt alternating current power supply. During the baking operation, however, the lower heating element is energized at 230 volts, and the upper heating element is energized at 115 volts, whereupon during baking the upper element has an output of only 750 watts. During broiling the lower unit is deenergized, and the upper unit is energized at 230 volts to provide its full rated wattage.

The modern electric range has a thermostat which controls the energy circuit to the heating elements according to the temperature at which the thermostat is set. Conventionally, range oven thermostats have a temperature range of from about 200 to 550° F. For baking or roasting operations, the oven temperature may be set anywhere between 250° F. and 450° F., depending on the cooking operation. In the usual thermostat-controlled circuit, only the lower heating element is cycled by the thermostat; the upper unit remains energized. This arrangement detracts from the accuracy of oven temperature control, with the result that the oven temperature only approximates the setting temperature. For broiling operations it is the practice to use the thermostat at its highest setting, and to have the oven door in a partially open position to prevent the oven temperature from reaching a level which would cause the thermostat to cycle the broil (upper) heating element.

The usual control system for range ovens includes a switch which will establish the "bake" circuit or the "broil" circuit, and also provide an off position. In addition to this switching circuit the range includes a thermostat whcih exercises control over the selected bake or broil circuit as above noted. In such arrangements, therefore, it is necessary for the cook to select on the first switch the cooking operation desired and then to set the thermostat to the control temperature which is appropriate to the forthcoming cooking operation.

It is an object of our invention to provide a thermostat which automatically establishes the proper electric energy circuit as the thermostat control dial is rotated from its off position to the setting appropriate to the contemplated cooking operation.

It is a further object of our invention to provide a thermostat having a low manufacturing cost while providing an electrical control system which, when at any selected "bake" setting, deenergizes both the top and bottom heating units when the thermostat reaches the control point.

It is yet another object of our invention to provide a combination thermostat and switching system in which the thermostat automatically establishes the necessary energy circuit without the necessity of first operating an independent switch to establish such circuit.

Other features and advantages will best be understood by the following description of a presently preferred embodiment read in connection with the accompanying drawings in which.

Figure 1:
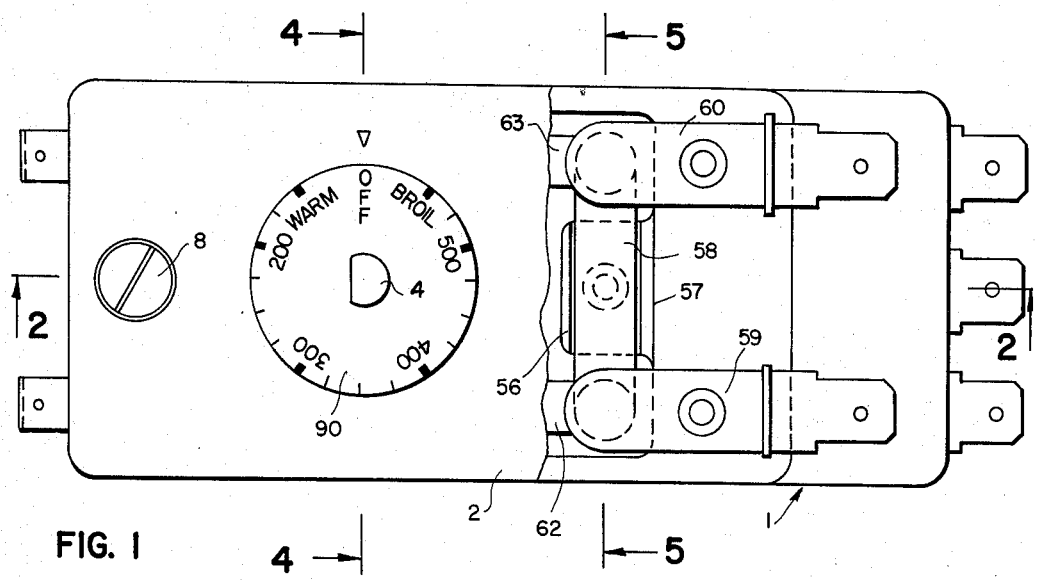
FIG. 1 is a top plan view of a thermostat embodying our invention, with a portion of the cover plate broken away to reveal certain of the switch elements.
Figure 4:
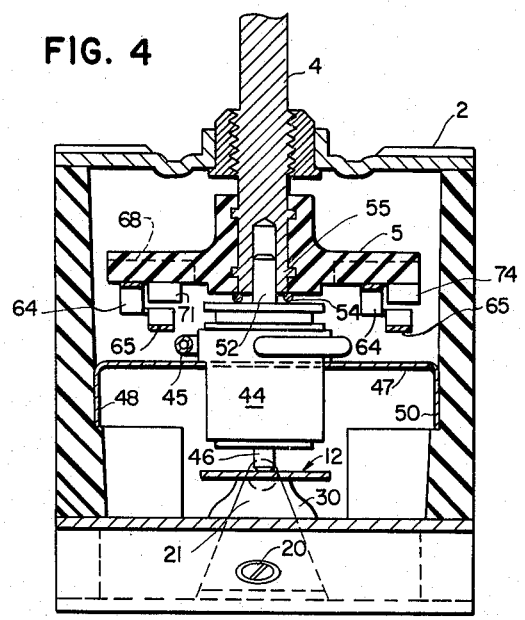
Figure 5:
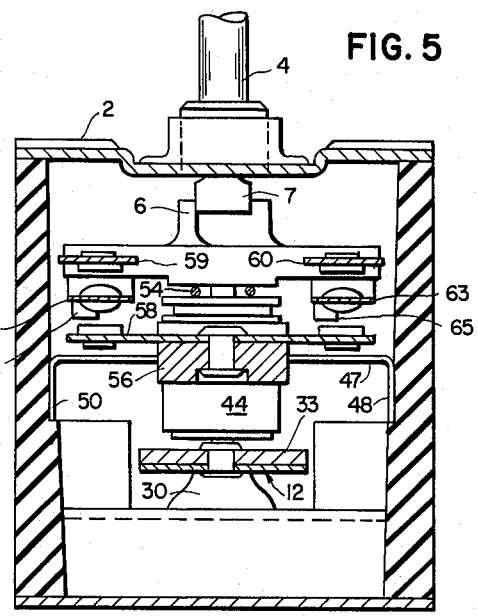
Figure 6:
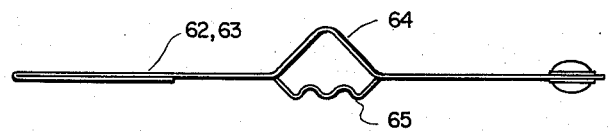

FIGS. 4 and 5 are sectional elevations, respectively taken on lines 4—4 and 5—5 of FIG. 1;

FIG. 6 is a side elevation of a contact element;

FIG. 7 is a top plan view of the switch-actuating cam;

FIGS. 8a and 8b are, respectively, developments of the cam tracks of FIG. 7; and FIG. 9 is a schematic circuit diagram.

Figure 2:
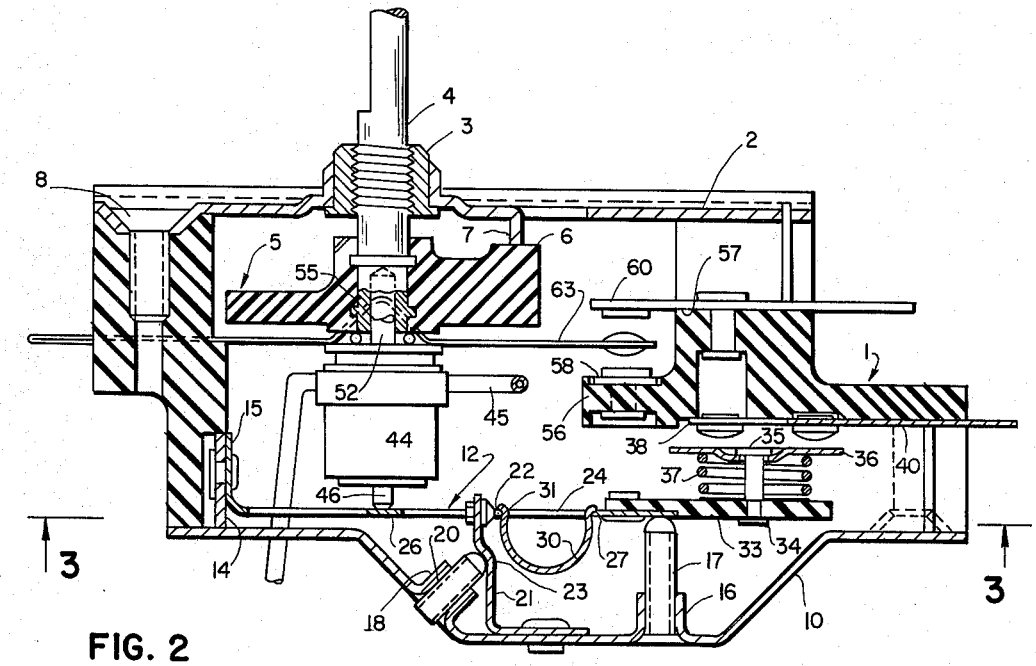
FIG. 2 is a side sectional elevation, taken on lines 2—2 of FIG. 1.

Referring first to FIGS. 1 and 2, a thermostat embodying our invention has a basic body structure 1 of a molded insulation material, and as such serving insulatedly to mount the several switching mechanisms later described. The body is closed at the top by means of the stamped cover 2 which is provided with the female threaded fixture 3 accommodating the male threaded shaft 4 on which is affixed the insulated cam 5. Said cam has a rib 6 arranged to cooperate with a stop finger 7 struck from the plate 2. Plate 2 is removably secured to the body 1 by screws such as the screw 8 passing into body wall structures provided therefor.

Also, the body is closed at the bottom by the stamped metal plate 10, screw fastened to the body by any suitable arrangement of screws (not shown). The bottom closure 10 serves primarily to support various accessory devices for the snap action blade 12. For example, the closure 10 has an upwardly struck tongue 14 to which an end 15 of said blade 12 is riveted, a threaded boss 16 which receives a stop screw 17, and a threaded boss 18 which receives an amplitude adjustment screw 20. An angular bracket 21 of resilient material is riveted to closure plate 10 and carries at its free end a pivot pin 22. Adjustment screw 20 seats against an offset 23 in the bracket 21, whereup it will be understood that the free end of the bracket may be moved in a clockwise direction as the screw is made up, or permitted to move in a counterclockwise direction under its inherent bias as the screw is withdrawn.

Figure 3:
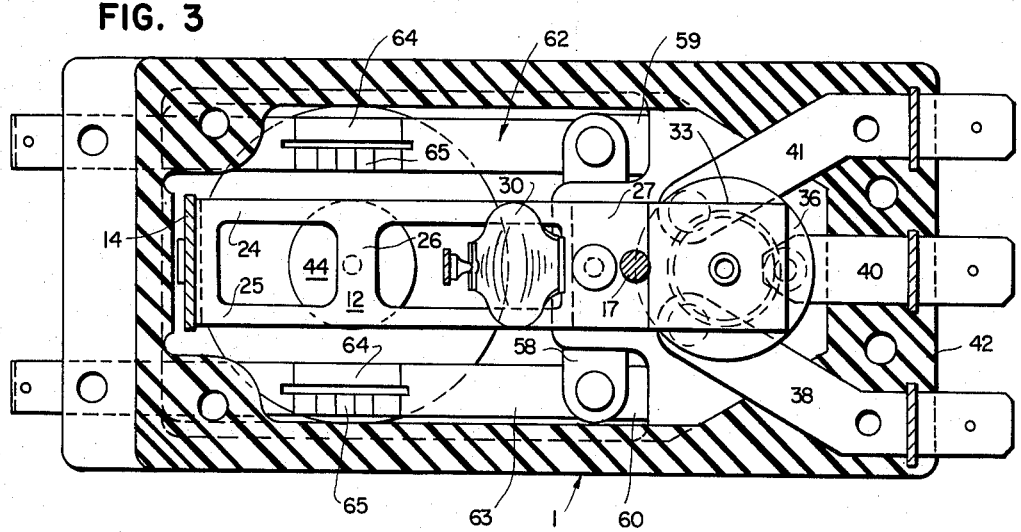
FIG. 3 is a bottom plan section, looking in the direction of the arrows 3—3 of FIG. 2.

As best shown in FIG. 3, the blade 12 comprises the side rails 24 and 25, joined by the center strip 26, and closed by the portion 27. The left hand edge of the portion 27, as viewed in FIG. 2, is knife-edged to seat within one leg of the U-shaped toggle spring 30; the other leg has a dimple 31 to receive the pivot pin 22. Generally speaking, this arrangement of blade 12 and toggle spring 30 is very well known in the art, and it is well understood that as the free end of the blade 12 traverses in either direction the overthrow center of the spring 30, the reaction of the spring imparts a snap action to the terminal movement of the blade. In the illustrated arrangement, the blade 12 is biased for upward movement as viewed in FIG. 2; movement in the opposite direction is accomplished by downward pressure exerted on the cross member 26.

The free end of the blade 12 rigidly mounts an insulating contact carrier 33 as by riveted securement thereto. Said carrier mounts a metal stud 34 having a head 35 at its free end; said stud relatively loosely accommodates the circular bridging contact 36. It will be noted that a central dimple of the contact 36 is occupied by the head 35 and that said contact is urged against the head 35 by way of the coil spring 37 which permits a free floating action of contact 36 as it closes against its associated fixed contacts.

FIG. 3 shows the three fixed contacts 38, 40 and 41, which seat within grooves in the shoulder 42 of housing 1, and are in any appropriate manner fixed therein. The free ends of the contacts have conventional silver contact buttons, said buttons being equiangularly disposed about the rim of the contact 36. The floatability of contact 36 insures that good connection is made with the respective contacts 38, 40 and 41. The contact system 36, 38, 40 and 41 is in the energy circuit of whatever mechanism is to be cycled to maintain performance at a selected level. In the oven mechanism, for example, the contact system will be in the energy circuit of the respective heating elements, as later described. Of course, the contact system may be in the energy circuit of an electro-motor operated fuel valve, or a ventilation system such as a blower, or ventilation dampers. In a heating system the contacts may be cycled in accordance with the departure of the controlled space or article from a preselected temperature condition. Alternatively, of course, the contact system may be in a pressure control situation in which the contacts are in the energy circuit of a compressor, valving system, or the like.

In any event, the power mechanism for operating the blade 12 to cycle the contact system includes an expansion-contraction power unit 44, FIGS. 2 and 4, which may comprise a conventional bellows or diaphragm structure into a head portion of which passes the open end of a "capillary" tube 45. In a temperature system the opposed end of the tube is sealed and means are provided to generate an internal pressure representative of a temperature condition sensed by said sealed end. For example, the sealed end may constitute a "bulb" (not shown) containing a charge of material capable of generating known and repetitious vapor pressures according to the temperature of the bulb. The increase or decrease of the pressure as the temperature rises or falls is evident by the expansion or contraction of the power unit. In a pressure responsive system the capillary tubing is open throughout its length, whereupon the power unit 44 is responsive to changes in pressure of the space communicating with the tubing. The power unit 44 has an axial stud 46 bearing symmetrically against the cross member 26 of the blade 12. The unit 44 is mounted within a resilient spring saddle 47 which, as best shown in FIG. 4, has legs 48, 50 which respectively seat in pockets provided in the side walls of the housing 1. The head 51 of the bellows 44 has a pilot 52 about which is placed a bearing collar 54 which bears against the annular end of the ferrule 55 which comprises the end of the adjustment shaft 4.

To effect primary circuit control by means of rotating the shaft 4 to its broil position or to any of its bake positions, we provide a switching system operated by rotation of the thermostat setting shaft. Referring to FIGS. 1 and 2, it will be noted that the body 1 has first and second step formations 56 and 57 which respectively insulatedly mount a fixed bridging contact 58 and the fixed contacts 59 and 60. The bridge contact 58 is provided with a contact button at each of its ends, and each of the contacts 59 and 60 has a contact button located directly above the buttons of the bridge contact. The vertical spacing between the contact 58 and the contacts 59 and 60, is occupied by the free ends of the respective spring leaf contacts 62, 63. The opposite end of each of said spring leaf contacts is anchored in the body 1 as shown in FIG. 2. The free end of each of the spring leaf contacts is provided with appropriate contact elements on each side for cooperation with the contact buttons on the fixed bridge or with the individual fixed contacts 59 and 60. The spring leaf contacts, of which one is shown in side elevational detail in FIG. 6, are preferably of silver bearing copper with fine silver contact buttons. Because of the thinness of the metal, the fixed end is doubled on itself as shown, whereby to form a spade terminal of adequate rigidity. In a location which will comprehend a suitable distance on each side of a plane taken through the axis of the shaft 4, each of the leaf contacts 62 and 63, is longitudinally split along its median line, as shown best in FIG. 3. One of the split portions is pressed out to provide a V-shaped cam follower 64 having a rounded apex as shown. To accommodate this pressed-out portion without imposing an eccentric strain on the leaf spring, the other split portion 65 is pressed downwardly to have the fluted shape illustrated.

These spring leaf contacts are operated from the intermediate "off" position of FIG. 1 to close against the bridge contact 58 or the respective upper contacts 59 and 60 by means of the cam 5 which is affixed to adjustment shaft 4 to rotate therewith.

As best shown in FIGS. 7, 8a, and 8b, cam 5 has two cam tracks, each of which has three identical levels. Cam track 67, for example, is at the outer periphery of the cam, and has a level 68 which comprehends 280°, level 70 which comprehends 40°, and level 71 which comprehends 40°. The inner cam 72 has a level 73 comprehending 280°, a level 74 comprehending 40°, and a level 75 comprehending 40°. The corresponding levels of each of the cams are on the same plane.

Spring leaf contacts 62 and 63 are biased normally to close against the upper contacts 59 and 60, and they will be able to make such contact as the cam 5 is rotated to bring the cam follower portion 64 of the contacts against the respective cam surfaces 68 and 73. To close the leaf contacts 62 and 63 against the bridging contact 58, the respective high portions 71 and 74 of the cam tracks must be brought to bear against the follower portion 64 of the spring leaf contacts. Obviously, the intermediate cam levels 70 and 75 establish the spring leaf contacts in their open circuit position. The several cam levels are established with recognition of the fact that cam 5 moves axially relative to the leaf contacts 62 and 63 as the shaft 4 is rotated.

Looking now at FIG. 9, the electric circuit schematically shows a broil unit 81 which would be at the top of the oven (not shown) and the bake unit 82 which would be at the bottom of the oven cavity. It is well known that the power supply for domestic electric ranges is 3-wire, single phase alternating current, using the so-called Edison system providing 230 volts across lead conductors L1 and L2, and 115 volts across either of the lead conductors and a neutral conductor N. When the circuit is energized for a baking operation the lower unit 82 is energized at 230 volts and the upper unit 81 at 115 volts; for a broiling operation the upper unit is energized at 230 volts, and the lower unit is deenergized. It is also to be understood that baking or roasting operations may be carried out at temperatures ranging from about 250° F. to about 450° F., depending on the cooking operation and foodstuff, but that broiling operations are carried out at maximum temperature. In broiling, the oven door is usually left partially open so that the oven will not attain a high enough temperature for the thermostat to cycle. In other words, whereas in baking or roasting operations the oven thermostat cycles to maintain the pre-selected oven temperature, in a broiling operation the thermostat maintains the broiling unit continuously energized. In broiling, therefore, the thermostat bridging contact 36 will remain closed against contacts 38, 40 and 41 during the entire broiling operation.

When the thermostat is set at 550° F., which as indicated on the dial 90 (FIG. 1) is the "broil" position, the cam 5 will assume a position in which the cam levels 71 and 74 urge the respective spring leaf contacts 62 and 63 to close against the bridging contact 58, whereupon it will be observed that the broil circuit is completed from L1, contacts 40, 38 (by way of bridging contact 36), conductor 83, broil unit 81, conductor 84, switch contact 63, bridge contact 58, and switch contact 62 to L2. It is obvious that the bake unit 82 is in an open circuit. A pilot light 85 is across L1 and N, in the obvious circuit.

When the thermostat is set at any temperature within the baking or roasting range, the cam 5 is established in a position in which the portions 68 and 73 permit the leaf spring contacts to close against the upper fixed contacts 59 and 60, whereupon the baking unit 82 is closed across 230 volts in a circuit including L1, contacts 40 and 41 (by way of bridge contact 36), conductor 86, unit 82, conductor 87, and closed contacts 59, 62 to L2. On the other hand, broil unit 81 is closed across 115 volts, the circuit being L1, contacts 38 and 40, conductor 83, unit 81, conductor 84, and closed contacts 63, 60 to N. So long as the bridging contact 36 is closed against contacts 38, 40, the pilot light will light.

As is well known in the art, the snap action blade 12 is stressed by the pressure resulting from the axial displacement of the power unit 44 as the adjustment shaft 4 is rotated to the desired control point, and increasing or decreasing temperatures sensed by the thermostat system cause the unit 44 to exert more or less pressure on the blade 12. When the expansion effort of the power unit overcomes the bias of the blade system, the blade system will react to disengage the bridging contact 36 from the contacts 38, 40 and 41. In this situation it is obvious that neither of the heating elements 81 or 82 will be energized, nor will be pilot light 85. As the oven temperature drops sufficiently to cause the spring blade to react in circuit closing direction, the circuit will be restored for operation of the bake unit 84 at full wattage across 230 volts and broil unit 81 at quarter-wattage against 115 volts, as above noted.

It will be seen, however, that we provide a control device which may be operated from an off position to a first position which conditions a cooking appliance for operation throughout a first temperature range to accomplish a desired cooking operation, or for operation at a temperature range related to a specific other cooking operation. This combination temperature control and appliance-conditioning function is effected by a single temperature adjustment shaft which upon rotation through appropriate angular distances establishes the operation range of the thermostat system and actuates switch means which prepares the appropriate energy circuit in the appliance.

While there has been described what is at present thought to be the preferred embodiment of the invention, it will be understood that various modifications may be made therein and it is intended to cover in the appended claims all such modifications as fall within the true spirit and scope of the invention.

We claim as our invention:

1. A circuit selector and temperature control device for establishing a first electric circuit adapted to maintain a first range of temperature in an enclosure or a second electric circuit adapted to maintain a second range of temperature in said enclosure, comprising, in combination:

thermostatic means having a power mechanism actuated between first and second positions according to the departure of said enclosure from a preselected standard temperature;

a first electric switching mechanism, comprising mutually insulated fixed contacts and a bridging contact;

means interconnecting said thermostatic power mechanism and said bridging contact for operating said bridging contact into engagement with said fixed contacts in a first position of said thermostat power mechanism, or separated from said fixed contacts in a second position of said mechanism;

a second switching mechanism, including a pair of mutually insulated spring contact elements, a pair of mutually insulated fixed contact elements disposed in vertical spaced relation to the respective spring contacts on one side thereof, and a fixed contact for bridging said spring contacts, said fixed bridging contact being disposed in vertical spaced relation to said pair of insulated spring contacts on the opposite side thereof;

a manually rotatable shaft mechanically connected with said thermostat means to establish optionally selectable temperature standards at which said thermostat power mechanism will operate between its said first and second positions;

cam means on said shaft mechanically connected with said spring contacts, said cam means including means being effective optionally to position both of said spring contacts in open circuit relation with their associated fixed contacts at one rotational position of said shaft, or in closed circuit relationship with their associated pair of fixed contacts upon rotation of said shaft to a position establishing operation of said thermostat at a desired temperature within the first range of temperature of said enclosure, or in closed circuit relationship with the associated fixed bridging contact upon rotation of said shaft to a position establishing operation of said thermostat within the second range of temperature of said enclosure;

means for connecting said first switching mechanism and said spring contacts and pair of fixed contacts of said second switching mechanism into the first electric circuit; and means for connecting said first switching mechanism and the spring contacts and fixed bridging contact of said second switching mechanism into the second electric circuit.

2. A thermostat according to claim 1, in which said mutually insulated fixed contacts include three contacts arranged in a triangular pattern and said bridging conductor comprises a metallic disc insulatedly mounted on said actuator device for rotational and angular displacement relative to said contacts, the center of said disc being substantially at the center of the triangle defined by said contacts.

3. A switching device for selectively controlling first or second electric circuits, comprising, in combination, thermosensitive mechanism adapted to expand or contract in response to increase or decrease in the temperature of an external body, means including a shaft rotatable through a first angular distance to condition said mechanism to respond to temperature changes within a first predetermined temperature range and rotatable through a second angular distance to condition said mechanism to respond to temperature changes within a second predetermined temperature range, an actuator engaging with said thermosensitive mechanism to be operated thereby between first and second positions according to the expansion or contraction thereof, first switch means including a plurality of switch contacts and a bridging conductor connected to and operated by said actuator to bridge with or disengage from said plurality of contacts upon operation of said actuator from one to another of its said positions, second switch means having a first position and a second position, said second switch means including first contact means for establishing a closed circuit through all of said plurality of contacts of said first switch means when said second switch means is in the first position, and said second switch means including second contact means for establishing a closed circuit through less than all of said plurality of contacts of said first switch means when said second switch means is in the second position, first mechanism operatively connected to said shaft and responsive to rotation of said shaft to any position within its first-named angular distance of rotation to operate said second switch means to its said first position, and second mechanism operatively connected to said shaft and responsive to rotation of said shaft to any position within its second-named angular distance of rotation to operate said second switch means to its said second position, said bridging conductor being commonly in each of the first and second electrical circuits whereby the respective circuits can be completed only when said bridging conductor is in its said bridging relation.

4. A switching device according to claim 3 in which said second switch means comprises a pair of mutually insulated contacts of leaf spring quality, a pair of mutually insulated first fixed contacts engageable with said leaf spring contacts to establish the first-named electric circuit and a second fixed contact adapted to bridge said leaf spring contacts to establish the second-named electric circuit.

5. A switching device according to claim 3 in which said second switch means includes a leaf spring contact having a free end disposed between fixed contacts and said first and second mechanisms for operating said second switch means to its first and second-named circuit establishing positions comprise a cam member having a first and second operating level comprehending said first and second angular distances respectively, and said leaf spring contact has means maintaining engagement with said cam member.

References Cited by the Examiner
UNITED STATES PATENTS

| | | | |
|---|---|---|---|
| 2,675,455 | 4/54 | Richardson | 200—140 X |
| 2,813,173 | 11/57 | Risacher | 219—20 |
| 2,813,176 | 11/57 | Miller | 200—140 |
| 2,816,998 | 12/57 | Fry et al. | 219—452 |
| 2,960,588 | 11/60 | Anderson et al. | 200—122 |
| 3,082,305 | 3/63 | Wunder | 200—122 |
| 3,096,420 | 7/63 | Dills | 200—140 |

FOREIGN PATENTS 236,421  8/59  Australia.

BERNARD A. GILHEANY, *Primary Examiner.*

RICHARD M. WOOD, *Examiner.*